United States Patent
Demond et al.

(10) Patent No.: US 11,534,856 B2
(45) Date of Patent: Dec. 27, 2022

(54) MOULDING ASSEMBLY FOR ALUMINOTHERMIC WELDING OF RAILS AND METHOD FOR ALUMINOTHERMIC WELDING OF RAILS

(71) Applicant: Pandrol, Raismes (FR)

(72) Inventors: Nicolas Demond, Lille (FR); Clément Meresse, Saint-Amand-les-Eaux (FR); Thiago Santos, Lille (FR)

(73) Assignee: Pandrol

( * ) Notice: Subject to any disclaimer, the term of this patent is extended or adjusted under 35 U.S.C. 154(b) by 0 days.

(21) Appl. No.: 16/753,610

(22) PCT Filed: Oct. 8, 2018

(86) PCT No.: PCT/FR2018/052467
§ 371 (c)(1),
(2) Date: Apr. 3, 2020

(87) PCT Pub. No.: WO2019/073151
PCT Pub. Date: Apr. 18, 2019

(65) Prior Publication Data
US 2020/0331094 A1    Oct. 22, 2020

(30) Foreign Application Priority Data

Oct. 9, 2017   (FR) ...................................... 1759449

(51) Int. Cl.
*B22D 19/04*       (2006.01)
*B23K 23/00*       (2006.01)
(Continued)

(52) U.S. Cl.
CPC .............. *B23K 23/00* (2013.01); *B22D 19/04* (2013.01); *B22D 19/0081* (2013.01);
(Continued)

(58) Field of Classification Search
CPC .... B22D 19/00; B22D 19/0081; B22D 19/04; B22D 27/04; B22C 9/00; B22C 9/06; B23K 23/00; B23K 2101/26; E01B 11/52
(Continued)

(56) References Cited

U.S. PATENT DOCUMENTS 3,113,359 A    12/1963   Burke

FOREIGN PATENT DOCUMENTS

CN    106424657 A  *  2/2017  ............. B22D 18/06
DE        568368 C        1/1933
(Continued)

OTHER PUBLICATIONS

Machine translation of CN 106424657 A (Year: 2017).*
(Continued)

*Primary Examiner* — Kevin P Kerns
(74) *Attorney, Agent, or Firm* — Lerner, David, Littenberg, Krumholz & Mentlik, LLP (57) ABSTRACT

A moulding assembly for aluminothermic welding of metal rails includes at least one mould part configured to come into contact with at least one other mould part and rails to be welded to form a mould cavity in which the ends of the metal rails to be welded are arranged and into which a molten metal is cast to weld the metal rails, wherein each mould part comprises includes a seating configured to be placed in contact least one of the rails, the seating including a groove into which a sealing product made of intumescent material is applied.

10 Claims, 9 Drawing Sheets

(51) Int. Cl.
    *B23K 101/26* (2006.01)
    *B22D 19/00* (2006.01)
    *B22D 27/04* (2006.01)
    *E01B 11/52* (2006.01)

(52) U.S. Cl.
    CPC .......... *B22D 27/04* (2013.01); *B23K 2101/26* (2018.08); *E01B 11/52* (2013.01)

(58) Field of Classification Search
    USPC ............... 164/53, 54, 332, 333, 349; 249/86
    See application file for complete search history.

(56) References Cited

FOREIGN PATENT DOCUMENTS

| | | |
|---|---|---|
| DE | 1758487 A1 | 3/1972 |
| DE | 29817107 U1 | 1/1999 |
| FR | 2323488 A1 | 4/1977 |
| JP | H08141756 A | 6/1996 |
| WO | 2007031528 A1 | 3/2007 |

OTHER PUBLICATIONS

International Search Report for Application No. PCT/FR2018/052467, dated Feb. 19, 2019, pp. 1-3.
French Search Report for Application No. FR1759449, dated Aug. 6, 2018, 2 pages.

* cited by examiner

MOULDING ASSEMBLY FOR ALUMINOTHERMIC WELDING OF RAILS AND METHOD FOR ALUMINOTHERMIC WELDING OF RAILS

CROSS-REFERENCE TO RELATED APPLICATIONS

The present application is a national phase entry under 35 U.S.C § 371 of International Application No. PCT/FR2018/052467 filed Oct. 8, 2018, which claims priority from French Application No. 1759449 filed Oct. 9, 2017, all of which are hereby incorporated herein by reference.

FIELD OF THE INVENTION

The present invention relates to a moulding assembly for aluminothermic welding and a method for aluminothermic welding of metal sections, in particular rails, implementing such a moulding assembly.

PRIOR ART

Aluminothermic welding of two metal sections consists in aligning the two metal sections in order that their ends are facing each other, then casting a molten metal into the space that separates the ends in order to weld the sections.

To carry out the welding, a mould comprising several parts enclosing the metal sections is used, thus forming a mould cavity containing the ends of the metal sections to be welded and intended to receive the molten metal.

This type of welding is usually implemented for the welding of metal rails, and in particular railway rails.

Due to the structure of the mould in several parts, and dimensional differences existing between the metal rails to be welded and the mould, the joins between the parts of the mould on the one hand, and between a part of the mould and the metal rails on the other hand, are not perfect, and it is thus necessary to make the mould leak tight before casting the metal.

This operation, called "sealing", is conventionally carried out by application of a paste or a sealant, sand, or instead a binder applied with an extruder gun, into the interstices to be filled, before or after putting in place the mould around the metal rails to be welded. These sealing products have refractory properties, that is to say that they are able to withstand contact with the molten metal when said molten metal is cast into the mould cavity, and generally give good leak tightness results.

However, the application of these sealing products is long and laborious since they need to be deposited with great precision to ensure optimal leak tightness of the mould. This also generates an additional financial cost for carrying out the weld, due to the purchase and the transport of the sealing product, sometimes representing up to several kilogrammes per welding.

Sealing products moreover generate a certain amount of waste which it is necessary to evacuate and process, which has a negative impact on the environment.

DESCRIPTION OF THE INVENTION

The aim of the invention is thus to overcome the drawbacks of the prior art by proposing a moulding assembly comprising a mould for aluminothermic welding of metal rails of which the sealing is carried out easily and rapidly.

An aim of the invention is also to propose such a moulding assembly of which the sealing of the mould is carried out with a reduced financial cost and leads to a reduced amount of waste, compared to moulds of the prior art.

Another aim of the invention is to propose a method for aluminothermic welding of metal rails which implements such a moulding assembly.

To this end, the invention relates to a moulding assembly for aluminothermic welding of metal rails, comprising at least one mould part configured to come into contact with at least one other mould part and rails to be welded in order to form a mould cavity in which the ends of the metal rails to be welded are arranged and into which a molten metal is cast in order to weld the metal rails, the moulding assembly mainly being characterised in that each mould part comprises a seating configured to be placed in contact with at least one of said rails, said seating comprising a groove into which a sealing product made of intumescent material is applied.

Optionally, the moulding assembly according to the invention may comprise the following characteristics:
- the groove comprises:
  - an inner edge, configured to close the mould cavity,
  - an outer edge, configured to separate the groove from the outside of the mould,
  - a bottom which extends facing the rails to be welded, and which connects the inner edge and the outer edge.
- the sealing product is recessed with respect to the seating, relative to the rail;
- the seating is provided with a compressible refractory lining able to come into contact with the rail during the mounting of the mould, the sealing product being applied on said compressible refractory lining;
- the mould part comprises a bottom part;
- the sealing product is in the form of a strip;
- the strip is a thermoformed strip or a strip obtained by moulding;
- the strip is conformable to the mould part;
- the intumescent material is selected from one or more of the following chemicals: sodium silicate, calcium silicate, ammonium phosphate, and co-extruded graphite.

The invention also relates to a method for aluminothermic welding of metal rails, wherein the ends of the metal rails to be welded are arranged in a mould cavity of an aluminothermic welding mould, said mould comprising at least two mould parts configured to come into contact with each other and the rails to be welded in order to form said mould cavity, each mould part comprising a seating configured to be placed in contact with at least one of said rails, said seating comprising a groove, the method comprising a step of casting a molten metal into the mould cavity, the method being mainly characterised in that it comprises, prior to the step of casting metal into the mould cavity, a step of application of a sealing product made of intumescent material in the groove.

Optionally, the method according to the invention may comprise the following characteristics:
- the method comprises a step of preheating the mould prior to the step of casting metal into the mould cavity, the sealing product being applied before said preheating step;
- the sealing product is applied before the assembly of the parts of the mould with the rail to form the mould cavity;

the sealing product is applied so as to be recessed with respect to the seating, relative to the rail;

the seating being provided with a compressible refractory lining able to come into contact with the rail during the mounting of the mould, the sealing product is applied on said compressible refractory lining;

the sealing product is in the form of a strip, the method comprising a step of shaping the strip prior to its application on a mould part;

the strip is a thermoformed strip or a strip obtained by moulding;

the strip is conformed to the mould part during its application;

the sealing product is in the form of a liquid, preferably selected from mastic or sealant;

the method further comprises, before casting the molten metal into the mould cavity, a step of application of the liquid on said at least one surface of the mould part facing the rail;

the application of the liquid is carried out by means of a brush, a knife, an extruder gun, or a high pressure piston;

the intumescent material comprises sodium silicate.

DESCRIPTION OF THE FIGURES

Other advantages and characteristics of the invention will become clear from the following description given as an illustrative and non-limiting example, with reference to the appended figures which represent.

DETAILED DESCRIPTION OF EMBODIMENTS OF THE INVENTION

The invention firstly relates to a moulding assembly comprising a mould for aluminothermic welding of metal sections, and quite particularly metal rails.

Figure 1:
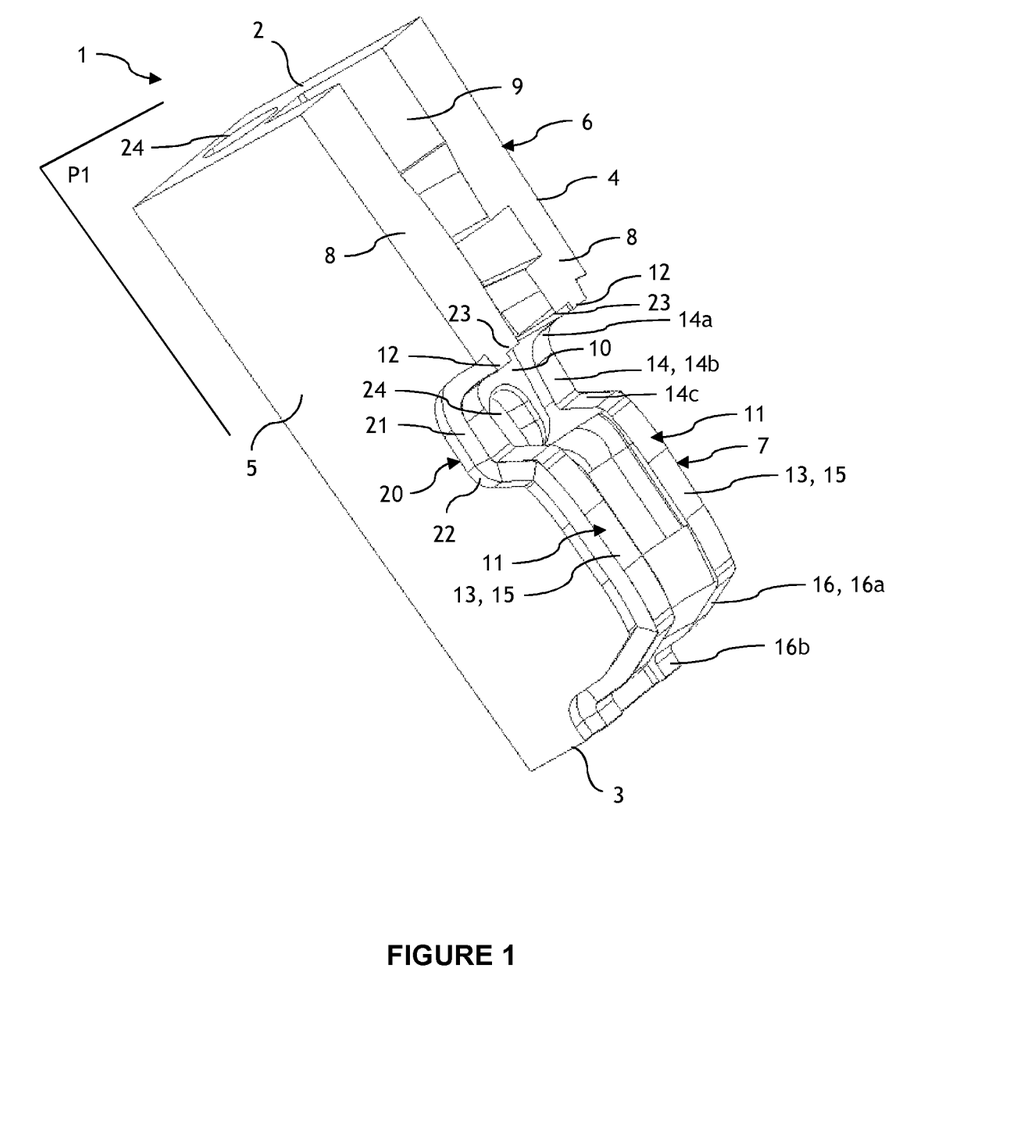
FIG. 1, a perspective diagram of a part of a mould for aluminothermic welding of metal rails, according to an embodiment of the invention.

Such a mould 100 is composed of two mould parts 1 having a substantially identical structure, of which one part is represented in FIG. 1 according to an embodiment, and a bottom part 50. The two parts 1 are suited to being assembled with each other, as well as to the bottom part 50, in order to form the mould 100 containing the ends 31 of the rails to be welded 30.

With reference to FIG. 1, each mould part 1 comprises an upper face 2, a lower face 3, and lateral faces 4, 5 joining the upper 2 and lower 3 faces. The mould part 1 is composed of an upper part 6 configured to be assembled to the upper part corresponding to a second mould part, and a lower part 7 configured to come into contact with the rail ends 31 in order to enclose them.

The mould parts 1 and 50 are made of a rigid refractory material, that is to say a material having good mechanical strength and which is able to withstand very high temperatures and, in particular, the temperature of the metal to be welded in the liquid state with which it enters into contact.

The mould part 1 is hollowed out over its entire length, from its upper face 2 to its lower face 3, so as to delimit two inner lateral surfaces 9 facing each other with respect to a longitudinal plane P1, and connected by a bottom 10. The inner lateral faces 9 are themselves hollowed out so as to form, with the bottom 10, one half of a casting chamber 101 (represented in FIG. 4) for the welding metal in the liquid state, the latter conventionally coming from a crucible made of a refractory material arranged above the casting channel.

Directional and positioning terms such as notably "above", and "below", "high", "low", "upper" or "lower" refer to the layout of the different constituent elements of the mould parts, or elements which cooperate with the mould parts, according to a conventional use of the mould, wherein the mould parts are mounted on a rail of which the foot rests on a support (generally the ground) transversal to the longitudinal plane P1 of the mould parts.

The frontal face 4 of the mould part 1 is provided with two contact surfaces 8 intended to come into contact with two corresponding contact surfaces of the second mould part 1 during the mounting of the mould 100.

The lower part 7 of the mould part 1 comprises two edges 11, called inner edges, which extend from the lower end of the contact surfaces 8 where they form slope breaks 12, to the lower end of the mould part 1. The inner edges 11 are delimited laterally by inner lateral surfaces 9 and by outer lateral surfaces 5 of the mould part.

Figure 4:
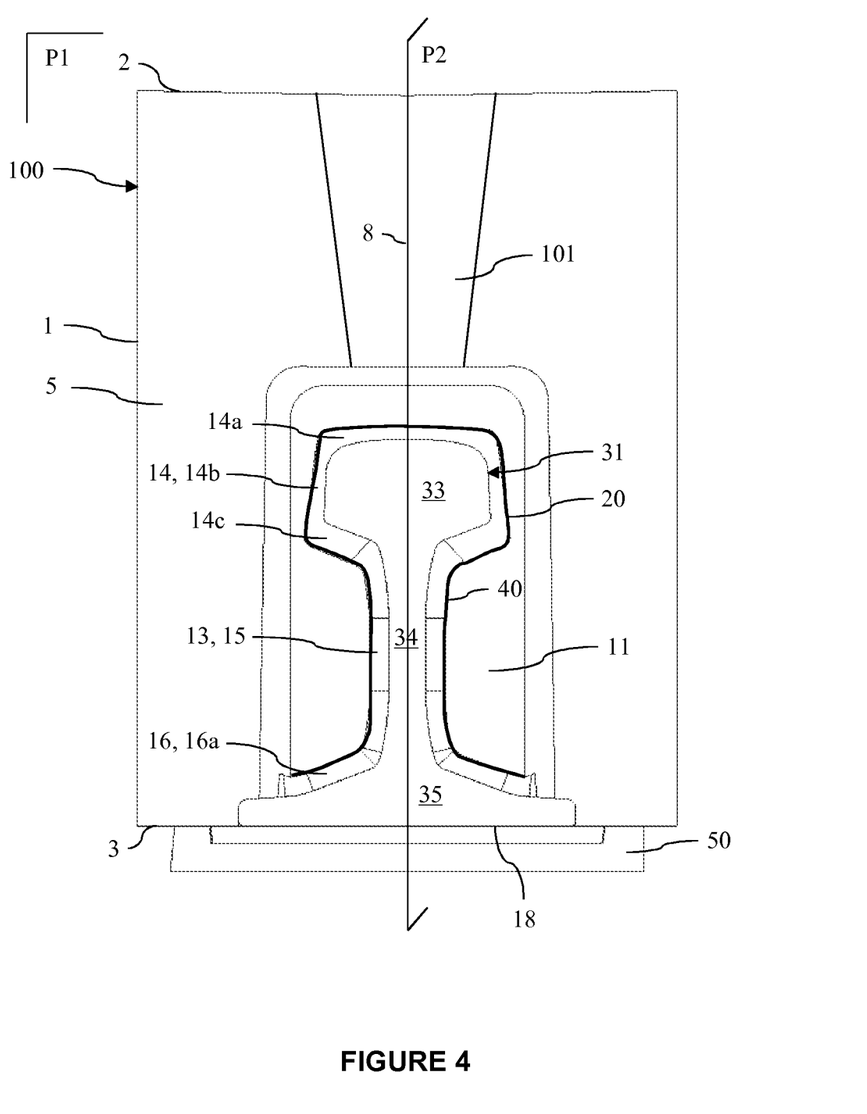
FIG. 4, a side and sectional view diagram of a mould formed by assembling two parts identical to that of FIG. 2 on either side of the ends of two rails to be welded in order to enclose said rail ends, according to an embodiment of the invention.

Each inner edge 11 comprises a seating 13 which extends along said edge, configured to come into contact with a rail end 31 during the mounting of the mould 100. The seatings 13 delimit, with the inner lateral surfaces 9 and the bottom 10 of the mould, once said mould has been assembled as represented in FIG. 4, a mould cavity 102, or mould chamber, containing the ends 31 of the rails to be welded and the space between the rails 30, and intended to receive the liquid metal coming from the casting chamber 101.

The seatings may be covered with felt. Felt is a material well known per se, constituted of compressible refractory fibres and bound by a refractory binder, applied on the seatings of the mould parts by means of a suitable adhesive, in order to close the mould cavity. Reference could be made to the document WO 2007/031528 for a description of such a mould provided with felt.

In the remainder of the description, P2 designates the longitudinal symmetry plane separating the rails 30 in their length on two sides of rails situated on either side of this plane, the plane P2 being perpendicular to the plane P1 and transversal to the plane of the support of the rails 30.

Each of the two seatings 13 is hollowed out, so as to define a high seating 14 of which the shape corresponds to that of one side of the head 33 of the rail 30, an intermediate seating 15 of which the shape corresponds to that of a side of the web 34 of the rail, and a low seating 16 of which the shape corresponds to that of a side of the foot 35 of the rail.

The upper seating 14 is in the form of a recess. It comprises a high portion 14a of which the shape corresponds to the top of the head 33 of the rail 30, an intermediate portion 14b of which the shape corresponds to a lateral edge of the head 33, and a lower portion 14c of which the shape corresponds to the base of the head 33.

The intermediate seating 15 is in the form of an overhang of which the shape corresponds to that of the web 34 of the rail 30.

The lower seating 16 is in the form of a recess. It comprises un upper portion 16a of which the shape corresponds to the top of the foot 35 of the rail 30, and a lower portion 16b of which the shape corresponds to a lateral edge of the foot 35.

An inner edge 11 delimits an outer recess 20 in the corresponding outer lateral face 5 of the mould part 1, at the level of said edge 11. The outer recess 20 extends along the edge 11, that is to say from the lower end of the contact surfaces 8 to the lower face 3 of the mould part 1.

The outer recess 20 is itself formed of a first outer surface 21 which extends from the seating 13 perpendicularly to said seating, and a second surface 22 which extends from the first surface 21 perpendicularly to said first surface and, hence, substantially parallel to the seating 13.

A chamfer 23 is formed in the angle joining the surface of the upper part 6 of the part and the upper seating 14. The shape of the chamfer 23 corresponds to the top of the head 33 of a rail end.

The mould part 1 further comprises a cooling pipe 24 of which one of the ends emerges on the upper face 2 of the mould part towards the outside of the mould 100, and the other end emerges in the mould cavity 102, at the level of the upper seating 14. Cuts are advantageously made in the contact surfaces 8 and in the inner lateral faces 9, and constitute passages for circulation of welding metal in the liquid state between the metal casting chamber 101 and the cooling pipes 24.

In order to mount the mould 100 represented in FIG. 4 and carry out the welding of the two ends of the rails, two mould parts 1 such as those described previously are assembled on the bottom part 50.

The contact surfaces 8 of the two mould parts 1 come into contact with each other, on either side of the plane P2, thus forming the metal casting chamber 101.

For each of the parts of the mould, the seatings 13 of the lower part 7 come to be placed in contact with a side of the two ends 31 of the rails 30 to be welded.

In this configuration, the bottom 10 of the mould parts is located facing the space between the two rail ends.

In detail, a first seating 13 covers a first side of the first rail end, a second seating 13 covers the first side of the second rail end, in an analogous manner to the first seating.

The same holds respectively for the second mould part mounted on the second side of the two rail ends.

When the two mould parts 1 are mounted on the rail ends 31 to be welded, the two seatings 13 of the first mould part mounted against each of the two rail ends on a first side of said rails, and the two seatings of the second mould part mounted against each of the two rail ends on a second side of said rails, form a mould cavity 102 which extends around the rail ends 31 and the space separating said rail ends. The mould cavity 102 is preferentially closed by the bottom part 50 able to be connected to the inner surface 9 of each mould part 1, so that the seatings of said bottom part 50 connect to the respective seatings 13 of the first and second mould parts 1.

During casting of metal in liquid form into the mould 100, the metal flows along the casting chamber 101 to the mould cavity 102 where it fills the space between the ends 31 in order to weld the rails 30 by aluminothermic reaction. Metal vapours and aluminothermic reaction products are discharged from the mould via the cooling pipes 24.

A sealing product 40, made of intumescent material, is applied on one or both mould parts 1. It may be applied on the mould parts before their assembly on the rails to be welded or directly on the assembled mould 100.

The material is called "intumescent" in that it is able to swell under the effect of heat brought about by an increase in the temperature of the mould, in particular within the mould cavity, so as to form an expanded system which is for example in the form of a foam or instead a solid shell. In practice, the intumescent material is configured to expand during the implementation of a so-called preheating step carried out before casting metal into the mould, enabling a progressive rise in temperature of the mould and the rail in order to facilitate the melting of the metal and to remove moisture from the mould. The expansion of the intumescent material is triggered when said material is subjected to a so-called "threshold temperature", dependent on its physical and chemical properties. Care will thus be taken so that the threshold temperature is close to the preheating temperature of the mould, preferably below said preheating temperature.

Preferably, the intumescent material is chosen from one or more of the following chemicals: sodium silicate, calcium silicate, ammonium phosphate, and co-extruded graphite.

Figure 3:
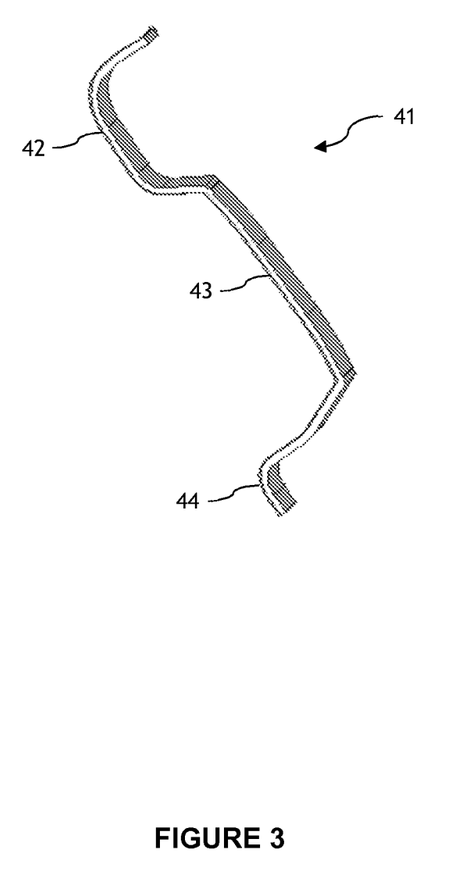
FIG. 3, a diagram of a thermoformable strip made of intumescent material.

According to a first embodiment, the sealing product 40 is in the form of a strip 41 represented in FIG. 3. The strip 41 is shaped in order that its shape corresponds to that of the surface of the mould part on which it must be applied subsequently.

The strip 41 may be thermoformable in that it is shaped at high temperature, prior to its mounting on the mould part 1 or 50, the shaping temperature of the strip being a function of the physical and chemical characteristics of the intumescent material, and being in practice well below its threshold temperature.

Alternatively, the strip 41 may be moulded in order to have the desired shape, then be applied on the mould part.

The strip 41 may be flexible or rigid depending on the nature of its constituent material and its dimensions. A flexible strip will however be preferred in order to facilitate the conformation of the strip to the mould part.

This first embodiment offers the advantage of providing a "ready to use" sealing product, in that it suffices to apply the strip 41 already formed on the surface concerned, notably by bonding for example, which is simple and rapid to carry out.

According to a second embodiment, the sealing product 40 is in the form of a liquid product to apply on the mould part. The term "liquid" refers to a liquid of low viscosity (for example a viscosity close to that of water, i.e. around $1*10^{-3}$ Pa·s) or of high viscosity (for example a viscosity close to that of engine oil, i.e. around 0.2 Pa·s). A sufficiently high viscosity will however be preferred to be able to apply the product on the surface(s) concerned easily, while avoiding that the product flows onto other surfaces on which is it not provided to apply them. Care will also be taken to choose a liquid product which requires a reduced drying time compared to that of the moulding operation.

The liquid product is preferably mastic or sealant.

This second embodiment offers the advantage of providing a sealing product 40 which can be applied on zones of complex shapes, without leaving zones to protect not however covered with product.

The sealing product makes it possible to isolate the mould cavity 102 from the outside environment, while preventing liquid metal from coming out of the mould cavity during the moulding operation.

The sealing product is positioned on at least one surface of the mould part 1 or 50, this surface being configured to be placed facing the rail 30 to be welded.

The sealing product has a tendency to deteriorate when it is exposed to too high heat, in particular over a long time period. Thus, the sealing product is preferentially positioned at a distance from the rail ends, in order that it expands during the preheating step, while avoiding that it is too exposed to heat and degrades. Too rapid degradation of the physical-chemical structure of the intumescent material constituting the sealing product would lead in fact to an incapacity of the sealing product to ensure the leak tightness of the mould up to solidification of the metal.

The sealing product is applied on the mould parts so as to be placed near to the mould cavity 102, and preferably outside of said mould cavity. Leak tightness of the mould cavity 102 is thus ensured while avoiding direct contact between the metal and the sealing product during casting of metal into the mould 100 which could cause burrs at the level of the junction between the rail and the bearing surface of the mould against the rail.

It may however be provided to position the sealing product at the level of the junction between the rail and the bearing surface of the mould against the rail (in particular on a seating 13, potentially covered with felt). In this case, the sealing product is capable of entering into contact with the molten metal. A sealing product capable of structurally withstanding contact with the molten metal is thus chosen.

The sealing product expands in the junction during the preheating step, then filling said junction, then the metal enters into contact with the expanded sealing product during the moulding step.

When the seating is covered by felt, the expansion of the sealing product compresses the felt even more. This offers the advantage of allowing the felt to compensate for the shrinkage of the sealing product when said sealing product is nearing the end of its life.

According to this embodiment, the structural and mechanical characteristics of the mould parts, and when it is present the felt, are adapted so as to avoid any detachment of the seatings with respect to the rails being able to induce poor leak tightness of the mould.

Figure 2:
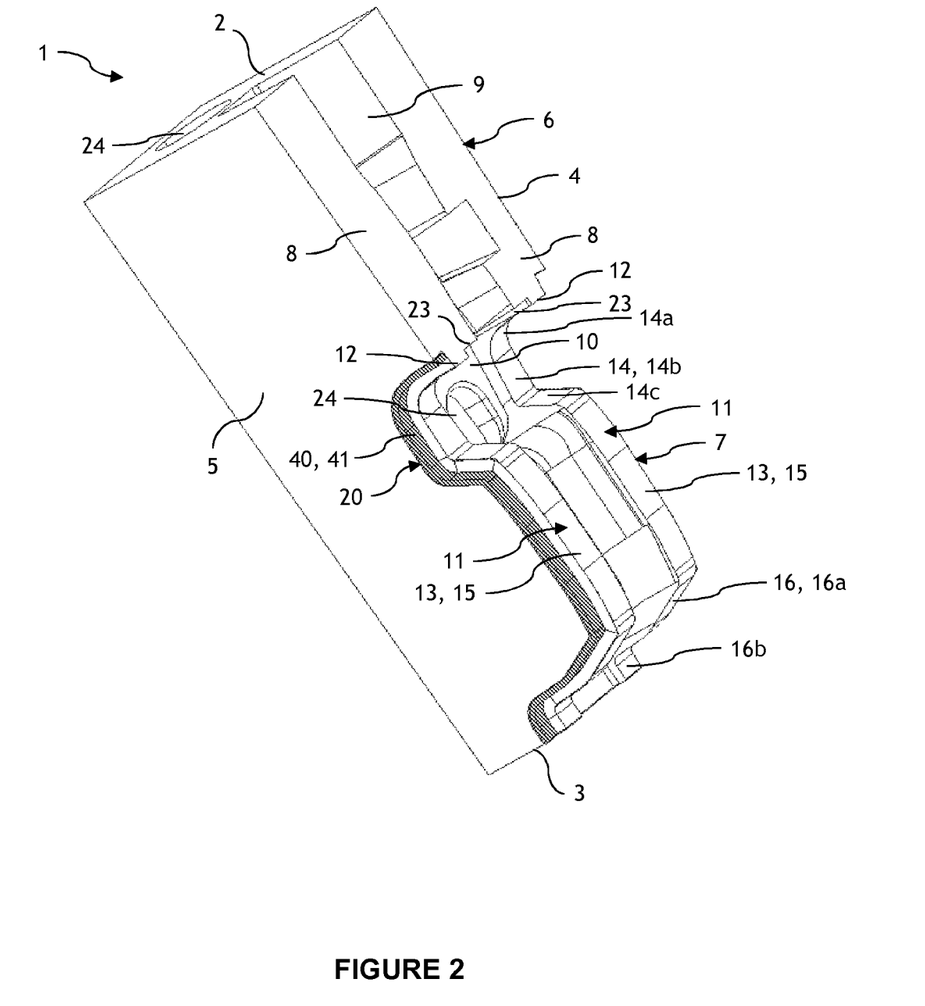
FIG. 2, a perspective diagram of the mould part illustrated in FIG. 1, which is equipped with a sealing product made of intumescent material, which is in the form of a thermoformable strip.

According to a preferred embodiment of the invention, with reference to FIGS. 2 and 3, the sealing product 40 is applied in the outer recess 20 delimited by an inner edge 11 of the mould part. It is applied on the second surface 22 of the recess so as to cover said second surface. In addition, as a function of the thickness of product applied, this also covers, at least partially, the first surface 21 of the recess. In the case where the sealing product is a thermoformable strip 41 such as represented in FIG. 3, the high portion 42 of the strip has a shape corresponding to that of the high seating 14, and is applied thereon. Similarly, the intermediate portion 43 and the low portion 44 of the strip 41 have a shape corresponding to those of the intermediate seating 15 and the low seating 16 respectively, and are applied thereon.

It is obviously possible if necessary to apply the sealing product 40 in the outer recess 20 so as only to cover simply a part of the second surface 22, that is to say a part of its length which extends from the break of slope 12 to the lower face 3 of the part, and/or a part of its width which extends from the first surface 21 to the outer lateral surface 5 of the mould part. This may prove to be appropriate if the sealing product is only intended to isolate simply a part of the mould cavity 102, and hence reduces the time required for the application of said sealing product as well as the amount of product required.

During the step of preheating the mould 100, the temperature within the mould increases up to a preheating temperature close to the temperature of the molten metal cast subsequently. The preheating temperature may notably be equal to the temperature of the liquid metal. The rise in temperature of the mould during preheating causes an increase in temperature inside and outside the mould cavity 102, in particular near to the mould cavity. When the threshold temperature is reached, the sealing product 40 expands and then occupies the entire volume of the outer recess 20, preventing the metal from coming out of the mould cavity 102 via the junction between the seatings 13 of the mould parts and the rails 30.

What has been described previously concerning the application of the sealing product on a surface of a mould part 1 also applies to the bottom part 50. The sealing product may thus be applied in particular on the seatings 18 of the bottom part 50, according to what has been described, the seatings 18 potentially comprising felt.

FIGS. 5A-C and 6A-D illustrate the behaviour of the sealing product during its application on a mould part according to the preceding embodiment, and during the subsequent moulding operation. The sealing product 40 is applied in the outer recess 20 delimited by an inner edge 11 of the mould part.

Figure 5A:
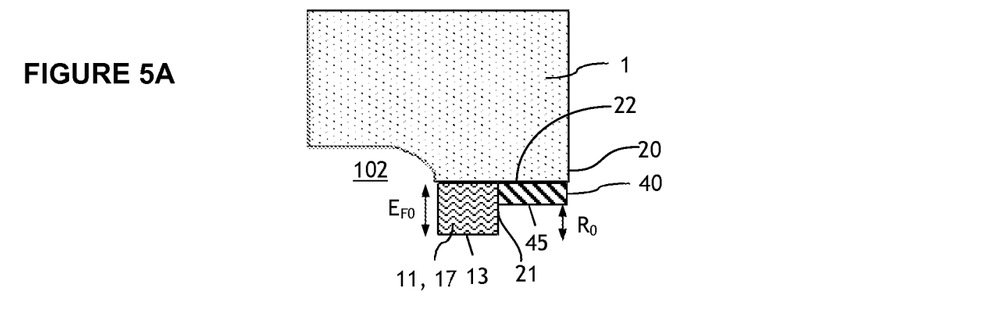
FIGS. 5A to 5C, schematic diagrams of the successive steps of putting in place a mould part equipped with a compressible refractory lining of felt type on a rail.
Figure 5B:
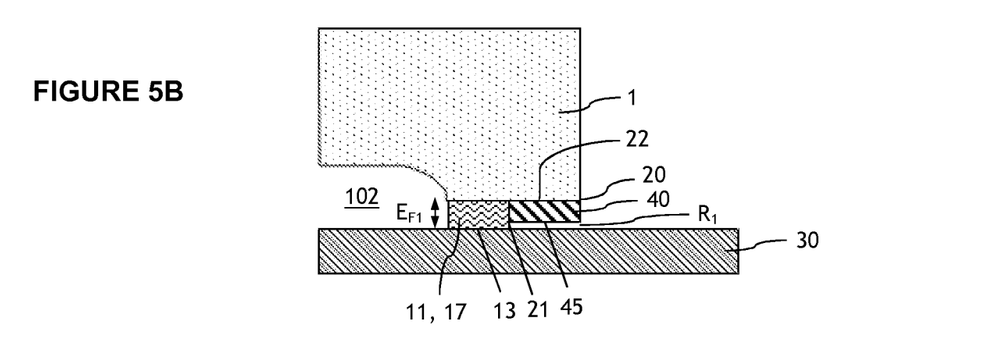
Figure 5C:
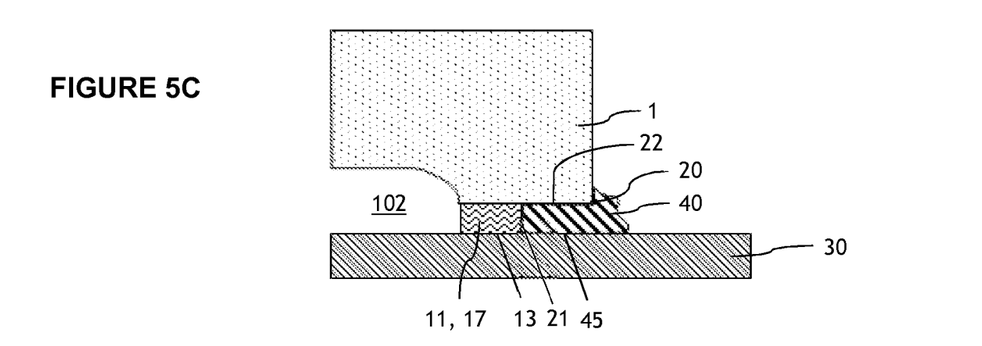

With reference to FIGS. 5A, 5B, and 5C, the mould 100 is a mould with felt. The presence of felt 17 makes it possible to dispense with a sometime laborious step of reducing the thickness of the inner edge 11, notably by scraping the excess of sand when the part is made of agglomerated sand, in order to adjust the distance between the mould part 1 and the rails 30.

According to FIG. 5A, a certain amount of the sealing product 40 is applied in the outer recess 20, prior to mounting of the mould. The felt 17 constitutes an edge of the mould part of which the seating 13 is intended to come into contact with a rail 30 to be welded. The felt 17 is in the free state (not compressed) and has a predetermined thickness noted $E_{F0}$. The seating 11 of the felt 17 and the surface 45 of the sealing product facing the rail are offset with respect to each other by a recess noted $R_0$.

According to FIG. 5B, the mounting of the mould part on the rail causes the compression of the felt 17 of which the thickness is reduced, passing from $E_{F0}$ to $E_{F1}$. The recess $R_0$ decreases as a function of the compression of the felt up to a value $R_1$. The preheating of the mould, prior to casting of the metal, causes the expansion of the sealing product 40 which then fills the volume of the recess 20 and overflows slightly outside of the recess, as illustrated in FIG. 5C.

Apart from the preservation of its structural integrity, the positioning of the sealing product 40 outside of the mould cavity 102, and the presence of the inner edge 11 equipped with felt separating the sealing product and the mould cavity, make it possible to avoid that the sealing product 40 expands into the junction between the seatings 13 and the rails 30, which could lead to an effect opposite to that desired, namely a slight detachment of the seatings 13 with respect to the rails 30 and poor leak tightness of the mould.

The recess $R_0$ between the seating 13 of the felt 17 and the surface 45 of the sealing product is advantageously chosen so as to enable good compression of the felt. In other words, the felt 17 must be able to be compressed into the desired compression state, without however the sealing product 40 coming into contact with the rail 30 before expansion. When the felt 17 is compressed, the sealing product 40 thus remains separated from the rail 30 by the recess $R_1$.

The recess $R_1$ subsisting after compression of the felt allows the sealing product to expand suitably into the entire volume of the recess 20, without overflowing too much outside of said recess.

With reference to FIGS. 6A, 6B, 6C, and 6D, the mould is a mould without felt. The inner edge 11 is thus constituted of the same material as the remainder of the mould part 1.

Figure 6A:
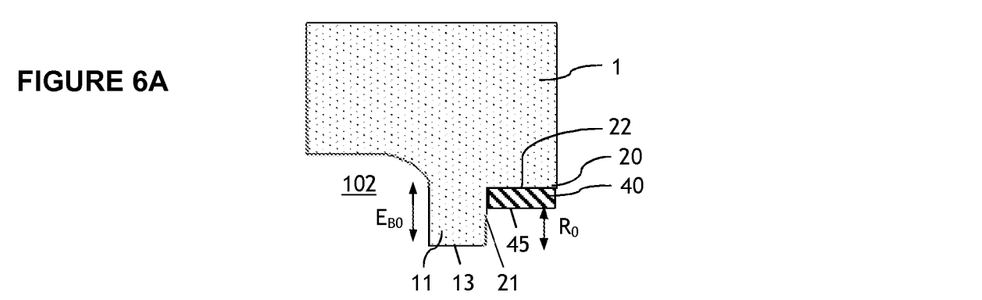
FIGS. 6A to 6D, schematic diagrams of the successive steps of putting in place a mould part without refractory compressible refractory lining on a rail.

According to FIG. 6A, a certain amount of sealing product 40 is applied in the recess 20, prior to mounting of the mould.

Figure 6B:
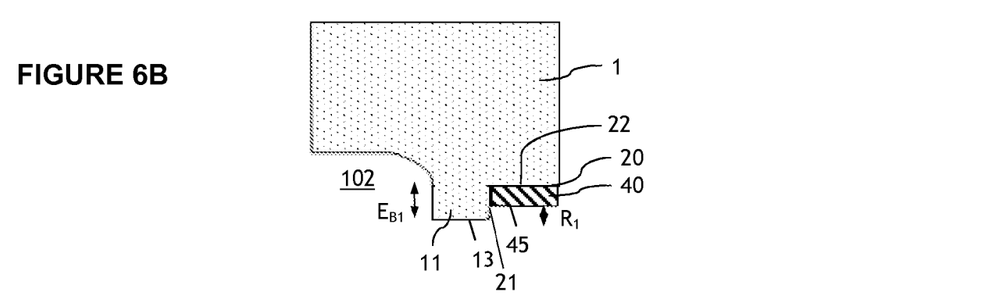
Figure 6C:
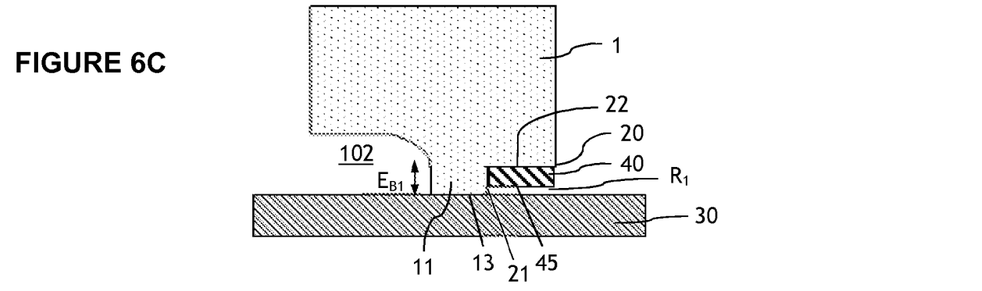
Figure 6D:
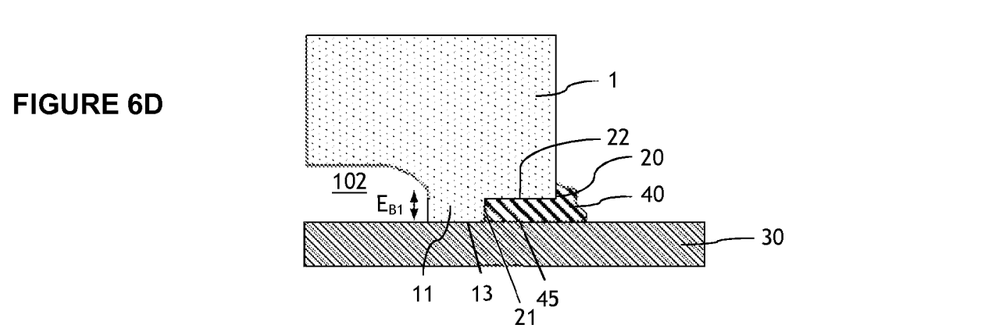

According to FIG. 6B, the inner edge 11 is next shortened, for example by scraping the excess of sand when the part 1 is made of agglomerated sand, in order to adjust the contact between the mould part 1 and the rail 30 in the desired manner. In so doing, the thickness of the edge 11 passes from $E_{B0}$ to $E_{B1}$, and the recess $R_0$ between the seating of the edge and the surface of the recess 20 facing the rail decreases to a value $R_1$.

In a similar manner to the preceding embodiment with the felt mould, the inner edge 11 separates the sealing product 40 from the mould cavity 102, thus avoiding any direct contact between the metal and the sealing product during a subsequent step of casting metal into the mould.

Furthermore, the recess $R_0$ between the seating 13 and the surface 45 of the sealing product is advantageously chosen so as to enable a predetermined shortening of the inner edge 11 in order to position the mould part 1 at a desired distance from the rail 30. In other words, the edge 11 must be able to be shortened such as desired, without however the sealing product 40 coming into contact with the rail before expansion. When the edge 11 is shortened, the sealing product 40 thus remains separated from the rail 30 by the recess $R_1$.

It goes without saying that the invention is not limited to the mould structure such as illustrated but that it applies to any aluminothermic welding mould, whatever the number and the shape of the mould parts constituting it. Furthermore, the intumescent sealing product may be applied on all the mould parts, or on only a part thereof.

FIGS. 7A, 7B, 7C, and 7D illustrate the behaviour of the sealing product during its application on a mould part such as described previously, and during the subsequent moulding operation. Unlike the preceding embodiment described with the support of FIGS. 6A to 6D, the seating 13 comprises a groove 60 separated from the outside of the mould. According to the embodiment represented, the groove 60 is delimited both by the inner edge 11, but also by an outer edge 61 which is arranged in an adjacent manner and at a distance from the inner edge, relative to the length of the rail and which separates said groove 60 from the outside of the mould.

Figure 7A:
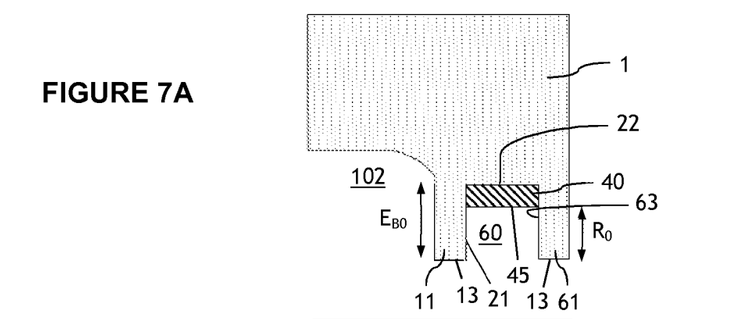
FIGS. 7A to 7D, schematic diagrams of the successive steps of putting in place a mould part without compressible refractory lining, of which the seating comprises a groove.

According to FIG. 7A, a certain amount of sealing product 40 is applied in the groove 60, prior to mounting of the mould. The sealing product may be applied on one or more of the surfaces of the groove 60 which are the first surface 21, the second surface 22 which forms the bottom of the groove, and the third surface 63 of the outer edge 61.

Figure 7B:
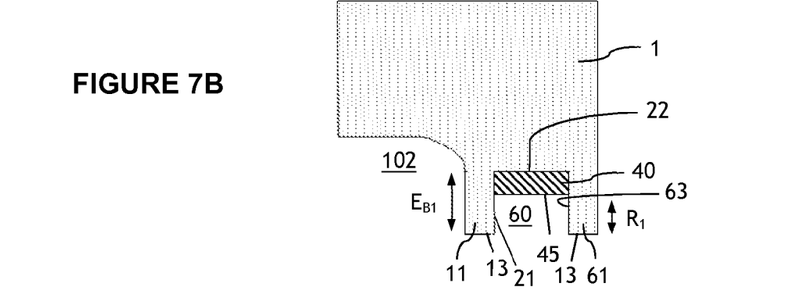

According to FIG. 7B, the inner edge 11 and the outer edge 61 are next shortened, for example by scraping the excess of sand when the part 1 is made of agglomerated sand, in order to adjust the contact between the mould part 1 and the rail 30 in the desired manner. In so doing, the thickness of the inner edge 11 and the outer edge 61 passes from $E_{B0}$ to $E_{B1}$, and the recess $R_0$ between the seating 13 and the surface 45 of the sealing product 40 facing the rail decreases down to a value $R_1$. For good adjustment of the mould with the rail, the inner edge 11 and the outer edge 61 are shortened to the same thickness $E_{B1}$.

Figure 7C:
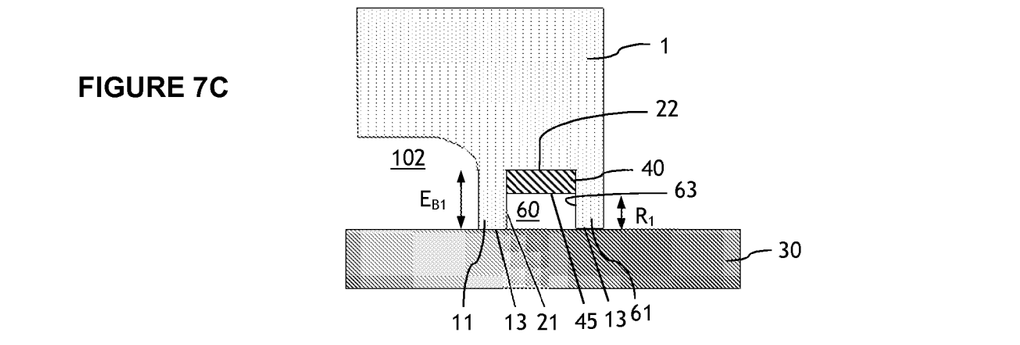
Figure 7D:
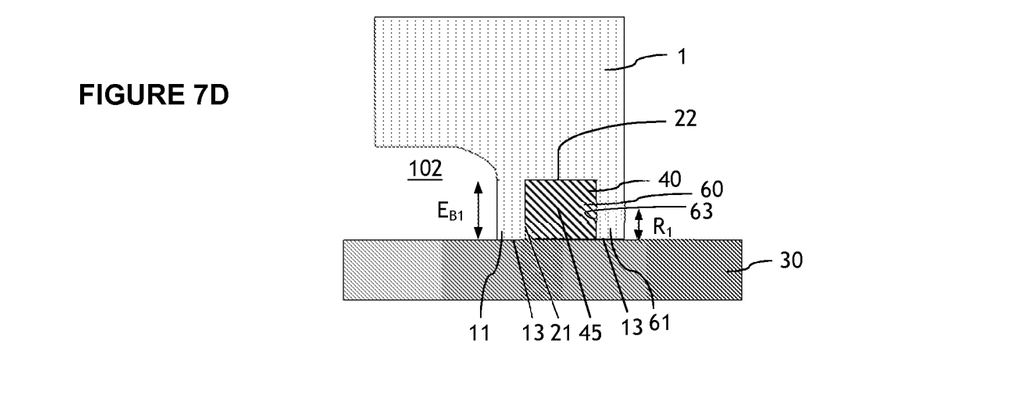
Figure 8A:
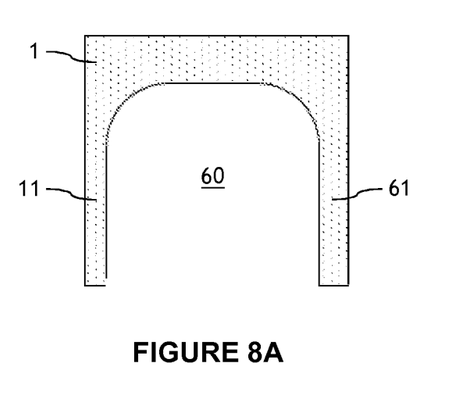
FIGS. 8A to 8D, diagrams of grooves of different shapes.
Figure 8B:
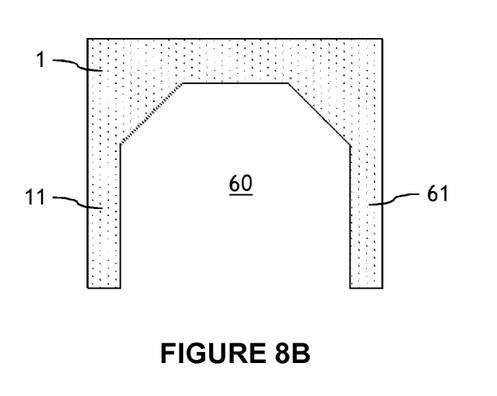
Figure 8C:
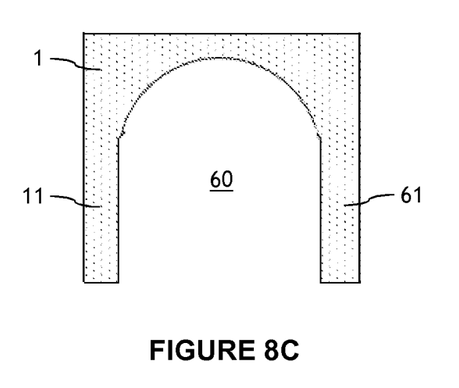
Figure 8D:
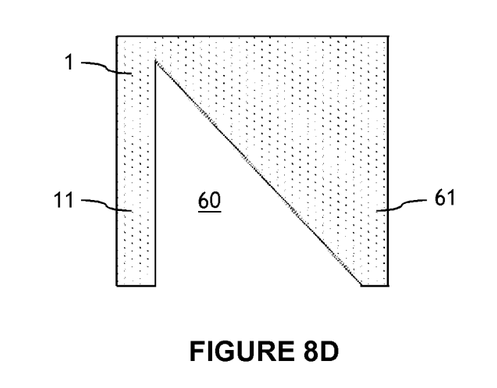

With reference to FIGS. 7C and 7D, the mould part 1 is next mounted on the rail 30 and preheating the mould, prior to casting the metal, causes the expansion of the sealing product 40 which then fills the volume of the groove 60.

The outer edge 61 separates the sealing product 40 from the outside of the mould, thus avoiding any overflow of the sealing product out of the groove 60, outside of the mould, during its expansion.

The inner edge 11 separates the sealing product 40 from the mould cavity 102, thus avoiding any direct contact between the metal and the sealing product during a subsequent step of casting metal into the mould.

The recess $R_0$ between the seating 13 and the surface 45 of the sealing product is advantageously chosen so as to enable a predetermined shortening of the inner edge 11 and the outer edge 61 in order to position the mould part 1 at a desired distance from the rail 30. In other words, the inner edge 11 and the outer edge 61 must be able to be shortened as desired, without however the sealing product 40 coming into contact with the rail before expansion. When the inner edge 11 and the outer edge 61 are shortened, the sealing product 40 thus remains separated from the rail 30 by the recess $R_1$.

With reference to FIGS. 8A, 8B, 8C, and 8D, the groove 60 may come in different shapes, as long as there is a continuity of the inner 11 and outer 61 edges delimiting the groove, it being understood that the height of said inner and outer edges is liable to vary along the groove as a function of the thickness of sand to remove to adjust the mould.

The groove 60 may be for example rounded, polygonal, or instead angular.

Figure 9:
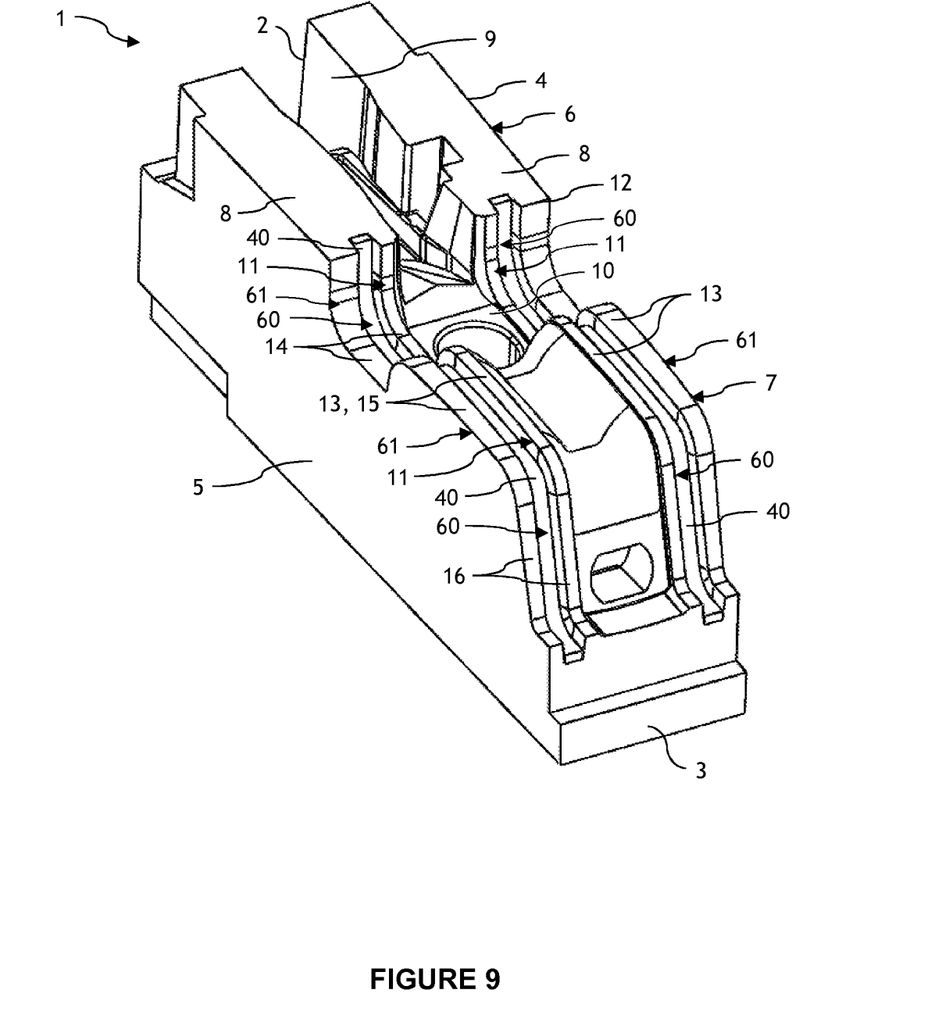
FIG. 9, a perspective diagram of a mould part, of which the seating comprises grooves such as illustrated in FIGS. 7A to 7D.

FIG. 9 illustrates a mould part, of which the seating 13 comprises two grooves 60, each being separated from the mould cavity by an inner edge 11 and separated from the outside of the mould by an outer edge 61.

The sealing product 40 is applied in the grooves 60, prior to mounting of the mould. The sealing product 40 covers the bottom 22 of the groove, and partially covers the first surface 21 of the inner edge 11 and the third surface 63 of the outer edge 61.

The invention claimed is:

1. A moulding assembly for aluminothermic welding of metal rails, said moulding assembly comprising at least one mould part configured to come into contact with at least one other mould part and rails to be welded in order to form a mould cavity in which ends of the metal rails to be welded are arranged, and into which a molten metal is cast in order to weld the metal rails, wherein each mould part comprises a seating configured to be placed in contact with at least one of said rails, said seating comprising a groove, wherein the moulding assembly further comprises a sealing product made of intumescent material, wherein said sealing product is applied into the groove of the seating, wherein the intumescent material is configured to expand under the effect of heat to provide sealing of the mould cavity to prevent the molten metal from coming out of the mould cavity via a junction between each seating of each mould part and the rails.

2. The moulding assembly of claim 1, wherein the groove comprises:
an inner edge, configured to close the mould cavity so as to separate the sealing product from the mould cavity,
an outer edge, configured to separate the groove from an outside of the at least one mould part, and
a bottom which extends facing the rails to be welded, and which connects the inner edge and the outer edge.

3. The moulding assembly of claim 1, wherein the sealing product is recessed with respect to the seating relative to the rails.

4. The moulding assembly of claim 1, wherein the mould part comprises a bottom part.

5. The moulding assembly of claim 1, wherein the sealing product is in the form of a strip.

6. The moulding assembly of claim 5, wherein the strip is a thermoformed strip, or a strip obtained by moulding.

7. The moulding assembly of claim 5, wherein the strip is conformable to the mould part.

8. The moulding assembly of claim 1, wherein the intumescent material is at least selected from the group of sodium silicate, calcium silicate, ammonium phosphate, and co-extruded graphite.

9. The moulding assembly of claim 1, wherein the sealing product is in the form of a liquid.

10. A moulding assembly for aluminothermic welding of metal rails, said moulding assembly comprising at least one mould part configured to come into contact with at least one other mould part and metal rails to be welded in order to form a mould cavity in which ends of the metal rails to be welded are arranged, and into which a molten metal is cast in order to weld the metal rails, wherein each mould part comprises a seating configured to be placed in contact with at least one of said rails, said seating comprising a groove, wherein the moulding assembly further comprises a sealing product made of intumescent material, wherein said sealing product is applied into the groove of the seating, wherein the intumescent material is configured to expand under the effect of heat to provide sealing of the mould cavity to prevent the molten metal from coming out of the mould cavity via a junction between each seating of each mould part and the rails,
wherein the groove comprises:
an inner edge, configured to close the mould cavity so as to separate the sealing product from the mould cavity,
an outer edge, configured to separate the groove from an outside of the at least one mould part,
a bottom which extends facing the rails to be welded, and which connects the inner edge and the outer edge, and
wherein the sealing product is in the form of a strip or in the form of a liquid.

* * * * *